Patented Oct. 25, 1938

2,134,521

UNITED STATES PATENT OFFICE 2,134,521

AZO DYESTUFFS AND THEIR PRODUCTION

Arthur Howard Knight, Blackley, Manchester, England, assignor to Imperial Chemical Industries Limited, a corporation of Great Britain No Drawing. Application April 1, 1936, Serial No. 72,206. In Great Britain December 24, 1935

15 Claims. (Cl. 260—186)

This invention relates to the manufacture and application of new water-soluble secondary disazo dyestuffs.

According to the invention I manufacture new water-soluble, secondary disazo dyestuffs devoid of sulfonic acid or carboxylic groups and having the general formula A→M→E by coupling a diazotized aminoaryl hydroxyalkyl ether or the sulfuric ester thereof (A) with a primary amine (M) of the benzene or naphthalene series capable of coupling in the para position to the amino group, diazotizing the aminoazo compound so obtained, coupling with a phenol (E) and, where the diazotized component A does not already carry a sulfuric ester group, treating the resulting disazo compound with an agent adapted to give sulfuric esters, for example, sulfuric acid monohydrate.

Also according to the invention I apply the new disazo dyestuffs, manufactured as defined above, to the coloring of acetate artificial silk, natural silk, tin-weighted silk, wool, and leather.

In coupling the first component (A) with the middle compound (M) it is frequently advisable to employ the latter in the form of its ω-sulfonate (e. g. anilino methane sulfonate) and subsequently to hydrolyze the so-formed monoazo compound.

The diazo components may be simply obtained as sulfuric esters by treating the corresponding aminoaryl hydroxy-alkyl ethers in a sulfating reaction; for example, by treating with sulfuric acid monohydrate.

The new dyestuffs, particularly in the form of their alkali-metal or ammonium salts, are soluble in water, and have good affinity for acetate artificial silk, to which material they may be applied by printing or by dyeing from a neutral, alkaline or acid bath. The yellow to orange shades so obtained are particularly non-phototropic, have exceptionally good light fastness and are very easily dischargeable.

The new dyestuffs are also valuable for the coloring of natural silk, tin-weighted silk, wool and leather.

The invention is illustrated but not limited, by the following examples, in which the parts are by weight.

Example I 153 parts of para-aminophenyl-beta-hydroxyethyl ether are dissolved in 3000 parts of water and 925 parts of 10% hydrochloric acid and diazotized by the addition of 69 parts of sodium nitrite. To the diazo solution, cooled to 5° C., is added with stirring, a solution of 143 parts of alpha-naphthylamine in 7000 parts of water and 370 parts of 10% hydrochloric acid, also cooled to 5° C. After stirring for about an hour a solution 400 parts of sodium acetate crystals in 1400 parts of water is gradually added during half an hour. When coupling is complete 1185 parts of 10% hydrochloric acid are added and the monoazo compound is diazotized at 5° C. by the addition of 72 parts of sodium nitrite. Stirring is continued for three hours and the solution of the diazo compound is then filtered. The filtrate is added during about twenty minutes to a cooled solution (at 5° C.) of 96 parts of phenol in 4000 parts of water containing 40 parts of caustic soda and 400 parts of anhydrous sodium carbonate. When coupling is complete the insoluble disazo compound is filtered off, washed with water and dried. The dried disazo compound is ground to a powder and added slowly during one and one-half hours to 1400 parts of concentrated sulfuric acid. The sulfuric acid solution so obtained is stirred for some hours, until conversion of the disazo compound into its sulfuric ester is complete. The reaction mixture is then poured into 1000 parts of water and 4000 parts of ice.

The new dyestuff separates from solution and is filtered off, washed with water, and the dyestuff paste ground with sufficient aqueous ammonia to neutralize any remaining sulfuric acid and convert the acid dyestuff into its ammonia salt. The neutral or slightly alkaline paste is then dried.

The new dyestuff dissolves in warm water to an orange-brown solution and dyes acetate artificial silk in yellowish-orange shades of very good light fastness.

Example II 153 parts of para-aminophenyl-beta-hydroxyethyl ether represented by the formula

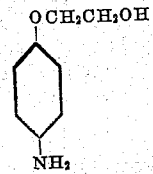

are diazotized, preferably as in Example I, and the solution of the diazo compound is added to a stirred solution of 153 parts of 2:5-dimethoxyaniline in 6000 parts of water and 370 parts of 10% hydrochloric acid at 10° C.

After stirring for a further hour a solution of 205 parts of sodium acetate crystals in 1200 parts of water is slowly added to the coupling mixture. When coupling is complete 560 parts of 10% hydrochloric acid are added and the monoazo compound diazotized at 10–15° C. by the addition of 72 parts of sodium nitrite. After stirring for three hours the solution of the diazo compound so obtained is filtered if necessary, cooled to 5° C., and added at a rate requiring about twenty minutes, to a solution at 5° C. of 96 parts of phenol in 4000 parts of water containing 40 parts of caustic soda and 360 parts of sodium carbonate.

When coupling is complete the insoluble disazo compound is filtered off, washed well with water and dried.

The dried disazo compound is then converted to its sulfuric ester in the manner described in Example I. The aqueous suspension of the acid dyestuff obtained after pouring the sulfuric acid solution into ice and water is filtered and the dyestuff paste washed with 5% brine. It is then creamed with 2000 parts of water, the suspension made alkaline by addition of sodium carbonate, 8000 parts of water added, and the mixture heated to 60° C., and salted out by addition of 1000 parts of salt. The dyestuff is then filtered off and dried.

The new dyestuff is a dark brown powder which dissolves in warm water to a reddish-orange solution and dyes acetate artificial silk in reddish-orange shades when applied from a neutral dyebath containing 1% salt.

*Example III*

23.3 parts of para-aminophenyl-beta-sulfatoethyl ether are diazotized in 300 parts of water containing 25 parts of 36% hydrochloric acid by the addition of 6.9 parts of sodium nitrite. The diazo solution so obtained is added to a solution of 15.3 parts of 2:5-dimethoxy-aniline in 600 parts of water containing 10 parts of 36% hydrochloric acid. During the addition the coupling medium is kept only faintly acid to Congo paper by periodic additions of sodium acetate. When coupling is complete, the monoazo compound after isolation and resuspension in water, if necessary, is dissolved as its sodium salt by the addition of caustic soda. 7 parts of sodium nitrite are then added to the solution, followed by 35 parts of 36% hydrochloric acid. When diazotization is complete, the suspension of the diazoazo compound so obtained is, if necessary, filtered, the diazoazo compound washed with 5% brine and then re-suspended in 400 parts of ice-cold water. The suspension so obtained is added to an ice-cold solution of 9.3 parts of phenol in 300 parts of water containing 4 parts of caustic soda and to which 16 parts of anhydrous sodium carbonate have been added. When coupling is complete, the disazo dyestuff is isolated by salting with 5% common salt (weight for volume) and filtering.

It has the same chemical constitution as the dyestuff of Example II and dyes acetate artificial silk in reddish-orange shades of very good light-fastness when applied from a neutral dyebath containing 1% salt.

If in the above example instead of 23.3 parts of para-aminophenyl-beta-sulfatoethyl ether there are used 24.7 parts of para-aminophenyl-γ-sulfatopropyl ether, a somewhat more soluble dyestuff is obtained, which dyes acetate artificial silk in similar reddish-orange shades.

*Example VI*

The solution obtained by diazotizing 23.3 parts of para-aminophenyl-beta-sulfatoethyl ether as described in Example III is coupled with 22.3 parts of sodium-meta-toluidino-methane sulfonate dissolved in 300 parts of water in the presence of sodium acetate. The monoazo compound so obtained is hydrolyzed with 2% caustic soda (weight for volume) at 50° C. to remove the methane sulfonate grouping. The resulting dyestuff solution is then cooled to 15° C., almost neutralized to litmus with 36% hydrochloric acid and salted with approximately 20% common salt (weight for volume). The precipitated monoazo dyestuff is filtered off, washed with 25% brine and then re-dissolved in 800 parts of hot water. After cooling the solution to 15° C., 7 parts of sodium nitrite are added, followed by 35 parts of 36% hydrochloric acid. When diazotization is complete, the resulting suspension is cooled to 5° C. and added to a solution at 5° C. of 9.3 parts of phenol in 300 parts of water containing 4 parts of caustic soda and to which 32 parts of anhydrous sodium carbonate have been added. When coupling is complete, the dyestuff is isolated by salting with 5% salt (weight for volume), filtering and drying. It dyes acetate artificial silk in orange shades when applied from a neutral dyebath containing 1% common salt.

*Example V*

23.3 parts of para-aminophenyl-beta-sulfatoethyl ether are diazotized as described in Example III and the diazo compound coupled with 14.3 parts of alpha-naphthylamine, dissolved in 500 parts of water and 10 parts of 36% hydrochloric acid. During the addition the coupling mixture is kept only faintly acid to Congo Red paper by periodic additions of sodium acetate. When combination is complete, the monoazo compound is made alkaline to brilliant yellow paper by addition of caustic soda and the mixture heated to 55° C. to dissolve the monoazo compound. 7 parts of sodium nitrite are then added with stirring and the mixture cooled to room temperature. 35 parts of 36% hydrochloric acid are then added and stirring continued for 2-3 hours. The suspension of diazoazo compound so obtained is, if necessary, filtered, the precipitate washed with 5% brine and then re-suspended in 600 parts of ice-cold water. The suspension of diazotized aminoazo compound is added to an ice-cold solution of 9.3 parts of phenol prepared as described in Example III. When coupling is complete the dyestuff is isolated by heating the mixture to 60° C., salting with 5% salt, filtering and drying. It dyes acetate artificial silk in orange shades of very good fastness to light when applied from a dyebath containing 1% common salt.

Further examples of dyestuffs made according to the invention are given in the following table.

| Example | Sulfuric ester of disazo compound A M E | | | Shade on acetate artificial silk |
|---|---|---|---|---|
| | A | M | E | |
| VI | Para-amino-phenyl-beta-hydroxyethyl ether. | 2:5-dimethoxy-aniline | Para-cresol | Very reddish orange. |
| VII | do | do | 1:3:5-xylenol | Orange. |
| VIII | do | do | Ortho-chloro phenol | Do. |
| IX | do | 3-amino-toluene | Phenol | Do. |
| X | 5-nitro-2-aminophenyl-beta-hydroxyethyl ether. | 3-amino-4-methoxy-toluene | do | Do. |
| XI | do | Aniline | do | Do. |

5-nitro-2-aminophenyl-beta-hydroxyethyl ether (m. p. 142° C.) may be made by acetylating the amino group of 5-nitro-2-amino-phenol, converting the product to its sodium salt, condensing with ethylene chlorhydrin and then removing the acetyl group by hydrolysis.

As many apparently widely different embodiments of this invention may be made without departing from the spirit and scope thereof, it is to be understood that I do not limit myself to the specific embodiments thereof except as defined in the appended claims.

I claim:

1. The process which comprises diazotizing a compound from the group consisting of para-aminobenzene-mono-hydroxyalkyl ethers and the sulfuric esters thereof, coupling it to a primary amine from the group consisting of primary aryl amines of benzene and naphthalene compounds in a position para to the amino group, diazotizing the product, and coupling it with a hydroxy benzene compound.

2. The process which comprises diazotizing 153 parts of para-aminophenyl-beta-hydroxyethyl ether in solution, adding the diazo solution to a solution of 153 parts of 2,5-dimethoxy-aniline in acidified water, diazotizing the product, coupling it in alkaline solution to phenol, grinding the dyestuff, adding it to concentrated sulfuric acid and isolating the dyestuff sulfuric acid ester.

3. The process which comprises diazotizing 233 parts of the sulphuric ester of para-aminophenyl-beta-hydroxyethyl ether in solution, adding the diazo solution to a solution of 153 parts of 2,5-dimethoxy-aniline in acidified water, diazotizing the product, and coupling it in alkaline solution to phenol.

4. The process which comprises coupling one of a group of compounds consisting of diazotized para-amino-phenyl-beta-hydroxyethyl ether and the diazotized sulfuric ester of para-amino-phenyl-beta-hydroxyethyl ether with 2,5-dimethoxy-aniline, diazotizing the product and coupling it to phenol.

5. A dyestuff represented by the formula:

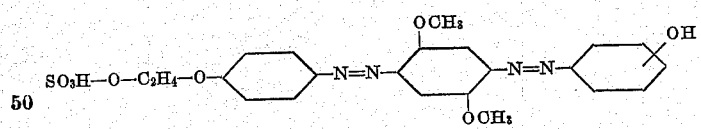

6. A process which comprises coupling a diazotized para amino aryl azo phenyl hydroxy alkyl ether sulfuric ester in which aryl is the radical of one of the group consisting of benzene and naphthalene compounds with a hydroxy benzene compound in an alkaline medium.

7. A compound represented by the formula

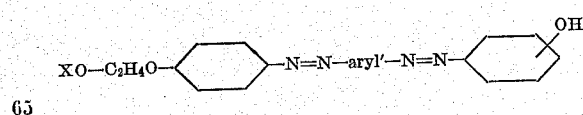

in which X is one of the group consisting of hydrogen, SO3H, SO3Na and SO3NH4, and aryl' is the radical of one of the group consisting of benzene and naphthalene compounds to which the azo bridges are connected in para positions.

8. A compound represented by the formula

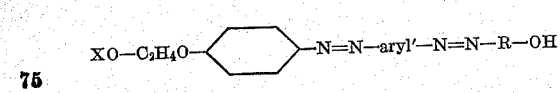

in which X is one of the group consisting of hydrogen, SO3H, SO3Na and SO3NH4, aryl' is the radical of one of the group consisting of benzene and naphthalene compounds to which the azo bridges are connected in para positions, and R is the residue of a mono-hydroxy benzene compound.

9. A compound represented by the formula

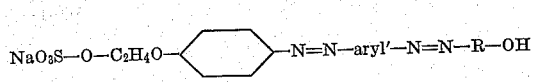

in which aryl' is the radical of one of the group consisting of benzene and naphthalene compounds to which the azo bridges are connected in para positions, and R is the residue of a mono-hydroxy benzene compound.

10. A compound represented by the formula

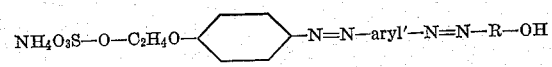

in which aryl' is the radical of one of the group consisting of benzene and naphthalene compounds to which the azo bridges are connected in para positions, and R is the residue of a mono-hydroxy benzene compound.

11. The process which comprises diazotizing a para-amino-phenyl-mono-hydroxyalkyl ether, coupling it to one of the group consisting of primary aryl amines of benzene and naphthalene compounds in the para position to amino, diazotizing the product, coupling said product to a mono-hydroxy benzene compound, and forming a sulphuric ester by subjecting the disazo product to sulphuric acid.

12. A compound represented by the formula

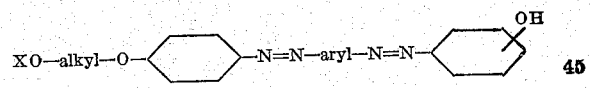

in which X is one of a group consisting of hydrogen, SO3H, SO3Na and SO3NH4; alkyl contains two to three carbons; and aryl is the residue after diazotization and coupling of an aryl amine of the group consisting of primary aryl amines of benzene and naphthalene compounds, the azo bridges being connected to aryl in para positions.

13. A compound represented by the formula

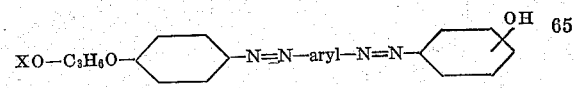

in which X is one of a group consisting of hydrogen, SO3H, SO3Na and SO3NH4; aryl is the residue of after diazotization and coupling of an aryl amine of the group consisting of primary aryl amines of benzene and naphthylamine compounds, the azo bridges being connected to aryl in para positions.

14. A compound represented by the formula
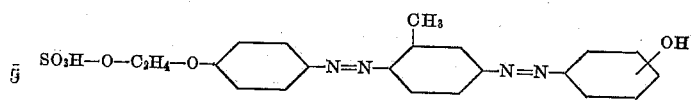
15. A compound represented by the formula
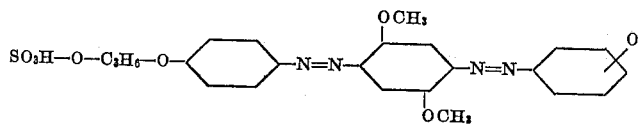
ARTHUR HOWARD KNIGHT.